(12) United States Patent
Liang et al.

(10) Patent No.: US 12,523,851 B2
(45) Date of Patent: Jan. 13, 2026

(54) WIDE-ANGLE LENS ASSEMBLY

(71) Applicant: Sunny Optics(Zhongshan)Co., Ltd., Zhongshan (CN)

(72) Inventors: Weichao Liang, Zhongshan (CN); Yongmao Ying, Zhongshan (CN); Wenbin Zou, Zhongshan (CN); Xiao Song, Zhongshan (CN)

(73) Assignee: Sunny Optics(Zhongshan)Co., Ltd., Zhongshan (CN)

( * ) Notice: Subject to any disclaimer, the term of this patent is extended or adjusted under 35 U.S.C. 154(b) by 404 days.

(21) Appl. No.: 18/339,612

(22) Filed: Jun. 22, 2023

(65) Prior Publication Data

US 2023/0341660 A1    Oct. 26, 2023

(30) Foreign Application Priority Data

Mar. 31, 2023  (CN) .......................... 202310349216.8
Mar. 31, 2023  (CN) .......................... 202320690538.4

(51) Int. Cl.
*G02B 13/00*   (2006.01)
*G02B 9/64*    (2006.01)
*G02B 13/06*   (2006.01)

(52) U.S. Cl.
CPC ........... *G02B 13/0045* (2013.01); *G02B 9/64* (2013.01); *G02B 13/06* (2013.01)

(58) Field of Classification Search
None
See application file for complete search history.

(56) References Cited

U.S. PATENT DOCUMENTS

| | | | |
|---|---|---|---|
| 11,320,631 B2* | 5/2022 | Liu ..................... | G02B 13/0035 |
| 2015/0241670 A1* | 8/2015 | Amano ................ | G03B 21/003 |
| | | | 359/680 |
| 2020/0096746 A1* | 3/2020 | Shih ...................... | G02B 13/04 |
| 2021/0181466 A1* | 6/2021 | Lee ......................... | G02B 13/04 |
| 2022/0082803 A1* | 3/2022 | Lu ......................... | G02B 13/04 |
| 2022/0128799 A1* | 4/2022 | Chen ..................... | G02B 13/18 |

* cited by examiner

*Primary Examiner* — Ryan Crockett
(74) *Attorney, Agent, or Firm* — Sughrue Mion, PLLC

(57) ABSTRACT

The present disclosure relates to a wide-angle lens assembly, which comprises, sequentially along an optical axis from an object side to an image side: a first lens, a second lens, a third lens, a fourth lens, a fifth lens, a sixth lens, a seventh lens, an eighth lens, a ninth lens and a tenth lens. The first lens, the second lens, the third lens, the fifth lens and the ninth lens each has a negative refractive power; the fourth lens, the sixth lens and the tenth lens each has a positive refractive power; and a refractive power of the seventh lens and a refractive power of the eighth lens are positive-negative opposite.

20 Claims, 5 Drawing Sheets

WIDE-ANGLE LENS ASSEMBLY

CROSS-REFERENCE TO RELATED APPLICATIONS

This application claims the priority and benefit of Chinese Patent Application No. 202310349216.8 filed on Mar. 31, 2023, and the priority and benefit of Chinese Patent Application No. 202320690538.4 filed on Mar. 31, 2023, the entire disclosures of which are incorporated herein by reference in their entity.

TECHNICAL FIELD

The present disclosure relates to the field of optical technology, and specifically to a wide-angle lens assembly.

BACKGROUND

With the development of optical imaging lens assemblies, in the fields of video monitoring, sports cameras and vehicle-mounted lens assemblies, the demands for lens assemblies are increasing, and the requirements on the higher imaging quality of the optical imaging lens assemblies are put forward. At the same time, in order to provide a wider visual field, the requirements on the large field-of-view of the optical imaging lens assemblies are put forward. In addition, in order to acquire more luminous flux, the requirements on the large aperture of the optical imaging lens assemblies are put forward. Meanwhile, for easy portability, the requirements on the small size and miniaturization of the optical imaging lens assemblies are put forward.

However, the conventional optical lens assembly can hardly satisfy with requirements of both high resolution and high brightness at the same time. Meanwhile, the field-of-view of conventional optical lens assembly is small, with undesired distortion emerges at the same time. Moreover, conventional optical lens assembly is large in size and thus is not easy to carry.

SUMMARY

In view of this, the present disclosure is intended to propose a wide-angle lens assembly to solve the problem that the current lens assembly cannot simultaneously take into account high resolution, high brightness, a large field-of-view, low distortions, a large aperture and miniaturization.

Embodiments of the present disclosure provide a wide-angle lens assembly, which comprises, sequentially along an optical axis from an object side to an image side: a first lens, a second lens, a third lens, a fourth lens, a fifth lens, a sixth lens, a seventh lens, an eighth lens, a ninth lens and a tenth lens, where the first lens, the second lens, the third lens, the fifth lens and the ninth lens each has a negative refractive power; the fourth lens, the sixth lens and the tenth lens each has a positive refractive power; and a refractive power of the seventh lens and a refractive power of the eighth lens are positive-negative opposite.

According to an embodiment of the present disclosure, the first lens is a convex-concave lens; image-side surfaces of the second lens, the third lens and the ninth lens are concave; the fourth lens, the sixth lens and the tenth lens are convex-convex lenses; the fifth lens is a concave-convex lens; an object-side surface of the seventh lens is convex; and an image-side surface of the eighth lens is convex.

According to an embodiment of the present disclosure, a maximal aperture D1 of the first lens and an effective focal length F1 of the first lens satisfy: $-2.5 < D1/F1 < -1.7$.

According to an embodiment of the present disclosure, an effective focal length F1 of the first lens and a total effective focal length F of the wide-angle lens assembly satisfy: $-2.5 < F1/F < -1$.

According to an embodiment of the present disclosure, an effective focal length F2 of the second lens and a total effective focal length F of the wide-angle lens assembly satisfy: $-5 < F2/F < -2$.

According to an embodiment of the present disclosure, a combined focal length F12 of the first lens and the second lens and a total effective focal length F of the wide-angle lens assembly satisfy: $-1.6 < F12/F < -0.5$.

According to an embodiment of the present disclosure, a diaphragm is disposed between the fifth lens and the sixth lens, and an absolute value of a distance d5 on the optical axis between an image-side surface of the fifth lens and the diaphragm and a total track length TTL of the wide-angle lens assembly satisfies: $0 < |d5/TTL| < 0.1$.

According to an embodiment of the present disclosure, an effective focal length F5 of the fifth lens and a total effective focal length F of the wide-angle lens assembly satisfy: $-7 < F5/F < -2$.

According to an embodiment of the present disclosure, an effective focal length F6 of the sixth lens and a total effective focal length F of the wide-angle lens assembly satisfy: $1.7 < F6/F < 3$.

According to an embodiment of the present disclosure, an effective focal length F9 of the ninth lens and a total effective focal length F of the wide-angle lens assembly satisfy: $-3.5 < F9/F < -1$.

According to an embodiment of the present disclosure, a combined focal length Fa of the first lens to the fifth lens and a total effective focal length F of the wide-angle lens assembly satisfy: $-2.8 < Fa/F < -1$.

According to an embodiment of the present disclosure, a combined focal length Fb of the sixth lens to the tenth lens and a total effective focal length F of the wide-angle lens assembly satisfy: $1.5 < Fb/F < 2.5$.

According to an embodiment of the present disclosure, a combined focal length Fa of the first lens to the fifth lens and a combined focal length Fb of the sixth lens to the tenth lens satisfy: $-1.2 < Fa/Fb < -0.5$.

According to an embodiment of the present disclosure, a maximal aperture D of the wide-angle lens assembly, a total track length TTL of the wide-angle lens assembly and a semi-image height H of the wide-angle lens assembly satisfy: $0 < D/TTL/H < 0.2$.

According to an embodiment of the present disclosure, a back focal length BFL of the wide-angle lens assembly and a total track length TTL of the wide-angle lens assembly satisfy: $0.1 < BFL/TTL < 0.3$.

According to an embodiment of the present disclosure, a focal length F1 of the first lens, a radius of curvature R11 of an object-side surface of the first lens and a radius of curvature R12 of an image-side surface of the first lens satisfy: $-2.2 < F1/R11 + F1/R21 < -1.3$.

According to an embodiment of the present disclosure, a combined effective focal length F34 of the third lens and the fourth lens and an effective focal length F of the wide-angle lens assembly satisfy: $1.5 < F34/F < 2.8$.

According to an embodiment of the present disclosure, an effective focal length F4 of the fourth lens and a radius of curvature R42 of an image-side surface of the fourth lens satisfy: $-0.9 < F4/R42 < 1.2$.

According to an embodiment of the present disclosure, an effective focal length F5 of the fifth lens and an effective focal length F6 of the sixth lens satisfy: $-2.8 < F5/F6 < -0.8$.

According to an embodiment of the present disclosure, a combined effective focal length F78 of the seventh lens and the eighth lens and an effective focal length F of the wide-angle lens assembly satisfy: $2.6 < F78/F < 7.9$.

According to an embodiment of the present disclosure, an effective focal length F10 of the tenth lens and an effective focal length F of the wide-angle lens assembly satisfy: $2.0 < F10/F < 3.7$.

According to an embodiment of the present disclosure, a radius of curvature R101 of an object-side surface of the tenth lens, a radius of curvature R102 of an image-side surface of the tenth lens, and an effective focal length F of the wide-angle lens assembly satisfy: $-0.5 < (R101+R102)/F < 1.1$.

According to an embodiment of the present disclosure, an effective focal length F of the wide-angle lens assembly and an entrance pupil diameter ENPD of the wide-angle lens assembly satisfy: $1.6 < F/ENPD < 1.9$.

According to an embodiment of the present disclosure, a radius of curvature R31 of an object-side surface of the third lens and a radius of curvature R32 of an image-side surface of the third lens satisfy: $-2.6 < (R31-R32)/(R31+R32) < 0.9$.

According to an embodiment of the present disclosure, a radius of curvature R71 of an object-side surface of the seventh lens and a radius of curvature R72 of an image-side surface of the seventh lens satisfy: $0.1 < (R71-R72)/(R71+R72) < 3.0$.

The wide-angle lens assembly in embodiments of the present disclosure uses ten lenses. By cooperation of the shapes and positive and negative refractive powers of the lenses, and reasonable setting of the parameters, the wide-angle lens assembly can achieve a large aperture (FNO≤1.8), a large field-of-view)(FOV≥160°, and/or high resolution (35 million pixels), and at the same time, can take into account at least one of the beneficial effects such as: miniaturization, small size, low distortions (the absolute value of an F-Theta distortion is less than 5%), a high relative illumination (RI≥50%) and not being out of focus under high and low temperatures.

BRIEF DESCRIPTION OF THE DRAWINGS

In order to more clearly illustrate the technical solution in embodiments of the present disclosure or in the prior art, the accompanying drawings required to be used in embodiments will be briefly introduced below. Obviously, the accompanying drawings in the following description are only some embodiments of the present disclosure. In addition, it is possible for those of ordinary skill in the art to obtain other accompanying drawings according to these accompanying drawings without any creative efforts.

DETAILED DESCRIPTION OF EMBODIMENTS

Figure 1:
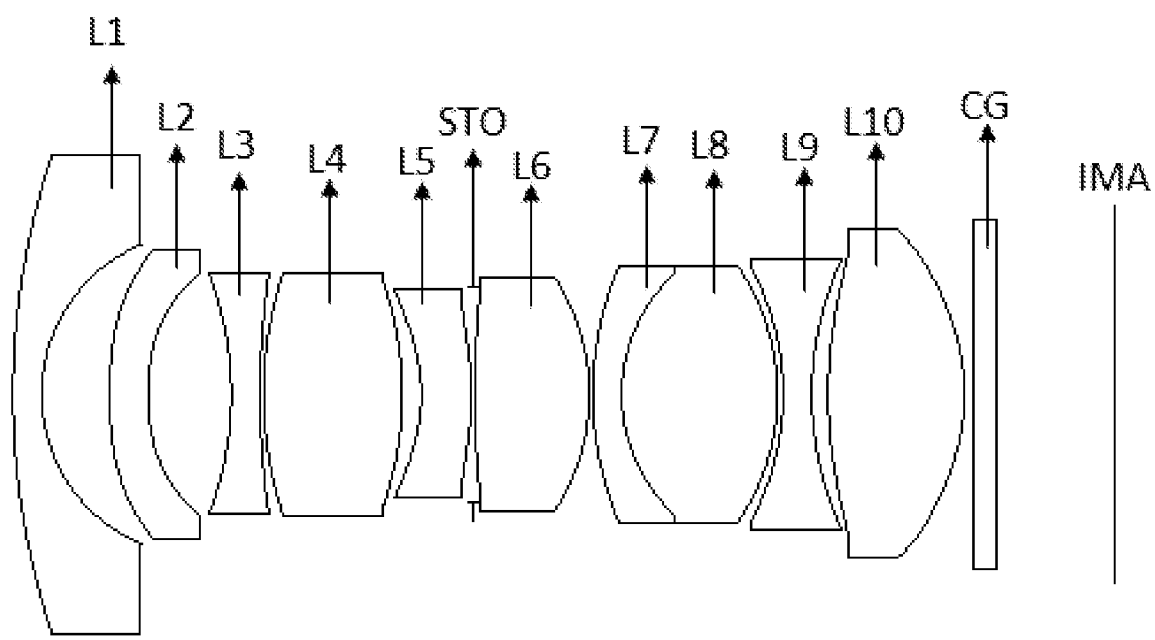
FIG. 1 is a schematic diagram of an optical structure of a wide-angle lens assembly according to Embodiment 1 of the present disclosure.

The description of embodiments in this specification should be combined with the corresponding accompanying drawings, and the accompanying drawings should be regarded as a part of the complete specification. In the accompanying drawings, the shapes or thicknesses in the embodiments may be exaggerated, and are marked in a simplified or convenient way. Moreover, parts of each structure in the accompanying drawings will be described separately. It should be noted that the element not shown in the accompanying drawings or not described by texts is in the form known to those of ordinary skill in the art.

In the description for the embodiments here, any reference to directions and orientations are just for convenience of description, and should not be construed as any limitation to the protection scope of the present disclosure. The following description for preferred implementations involves a combination of features. The features may exist independently or as a combination, and the present disclosure is not particularly limited to the preferred implementations. The scope of the present disclosure is defined by the claims.

In embodiments of the present disclosure, a paraxial area refers to an area near an optical axis. If a lens surface is a convex surface and the position of the convex surface is not defined, it denotes that the lens surface is a convex surface at least at the paraxial area. If the lens surface is a concave surface and the position of the concave surface is not defined, it denotes that the lens surface is a concave surface at least at the paraxial area. A surface of each lens that is closest to a photographed object is referred to as the object-side surface of the lens, and a surface of the each lens that is closest to an image side is referred to as the image-side surface of the lens.

As shown in FIGS. 1-5, the wide-angle lens assembly in embodiments of the present disclosure includes a first lens L1, a second lens L2, a third lens L3, a fourth lens L4, a fifth lens L5, a diaphragm STO, a sixth lens L6, a seventh lens L7, an eighth lens L8, a ninth lens L9, a tenth lens L10, a flat cover glass CG and an image plane IMA sequentially along an optical axis from an object side to an image side.

Here, the first lens, the second lens, the third lens, the fifth lens and the ninth lens each has a negative refractive power; the fourth lens, the sixth lens and the tenth lens each has a positive refractive power; and a refractive power of the seventh lens and a refractive power of the eighth lens are positive-negative opposite.

In a preferred implementation of the present disclosure, the first lens L1 is a convex-concave lens having a negative refractive power, which is conducive to reducing the incident angle of incident light on the object-side surface of the second lens L2. Accordingly, the light enters the rear optical system smoothly, which is conducive to the correction of aberrations of the rear group.

In a preferred implementation of the present disclosure, the second lens L2 is a lens having a negative refractive power and a concave image-side surface, which plays the role of diverging light, to further reduce the incident angle of the light on the object-side surface of the third lens L3 and reduce the off-axis aberration of the subsequent optical system, thereby realizing a higher imaging quality.

In a preferred implementation of the present disclosure, the third lens L3 is a lens having a negative refractive power and a concave image-side surface, which plays the role of diverging light, to make the light trend smooth, and at the same time, which is conducive to making the light at a large angle enter the rear lens as much as possible, thereby improving the illumination of the lens assembly.

In a preferred implementation of the present disclosure, the fourth lens L4 is a convex-convex lens having a positive refractive power, which is conducive to the convergence of light. Accordingly, the incident height of the light on a next lens is reduced, and the aperture of the lenses at the rear end is reduced, which is conducive to the miniaturization of the lens assembly.

In a preferred implementation of the present disclosure, the fifth lens L5 is a concave-convex lens having a negative refractive power, and thus can balance spherical aberrations. This lens may adopt an aspheric surfaces, which can correct the field curvature, thereby achieving a higher imaging quality.

In a preferred implementation of the present disclosure, the sixth lens L6 is a convex-convex lens having a positive refractive power, used for the convergence of light, which is conducive to balancing the negative spherical aberration and field curvature produced by the fifth lens L5, thereby improving the imaging quality of the system.

In a preferred implementation of the present disclosure, the seventh lens L7 is a lens having a convex object-side surface, which is conducive to the effective transition of the light from the front part and the correction of the field curvature, thereby improving the imaging quality.

In a preferred implementation of the present disclosure, the eighth lens L8 is a lens having a convex image-side surface, which helps the light at a large angle to be smoothly incident on the image plane, which is conducive to improving the illumination of the lens assembly.

In a preferred implementation of the present disclosure, the ninth lens L9 is a lens having a negative refractive power and a concave image-side surface, and thus can correct the spherical aberration and coma aberration of the eighth lens L8, which is conducive to improving the imaging quality.

In a preferred implementation of the present disclosure, the tenth lens L10 is a convex-convex lens having a positive refractive power, which is conducive to reducing a chief ray angle in order to match the requirements of the CRA curve of the chip.

In preferred implementations of the present disclosure, the wide-angle lens assembly further includes a diaphragm STO, and the diaphragm STO is located between the fifth lens L5 and the sixth lens L6. However, it should be noted that the position of the diaphragm STO disclosed herein is merely an example, rather than a limitation. In alternative implementations, the diaphragm STO may be disposed at other positions according to actual requirements.

In a preferred embodiment of the present disclosure, the seventh lens L7 and the eighth lens L8 are cemented, which is conducive to reducing the air space between the two lenses, thereby miniaturizing the lens assembly. Moreover, the sensitive tolerance problem such as inclination and eccentricity caused during assembling the lenses can be reduced, and the chromatic aberration is corrected to a certain extent, which is conducive to realizing a higher imaging quality.

In a preferred embodiment of the present disclosure, a maximal effective aperture D1 of the first lens L1 and an effective focal length F1 of the first lens L1 satisfy: $-2.5<D1/F1<-1.7$, which helps the lights at large angles to be incident into the optical system, thereby enlarging the field-of-view of the optical system.

In a preferred embodiment of the present disclosure, an effective focal length F1 of the first lens L1 and a total effective focal length F of the wide-angle lens assembly satisfy: $-2.5<F1/F<-1$. Such settings make the first lens L1 play the role of diverging light, make the light trend smooth, and at the same time, is conducive to making the lights at large angles enter the rear lens as much as possible, thereby improving the illumination of the lens assembly.

In a preferred embodiment of the present disclosure, an effective focal length F2 of the second lens L2 and the total effective focal length F of the wide-angle lens assembly satisfy: $-5<F2/F<-2$. Such settings make the second lens L2 play the role of diverging light, make the light trend smooth, and at the same time, is conducive to making the lights at large angles enter the rear lens as much as possible, thereby improving the illumination of the lens assembly.

In a preferred embodiment of the present disclosure, a combined focal length F12 of the first lens L1 and the second lens L2 and a total effective focal length F of the wide-angle lens assembly satisfy: $-1.6<F12/F<-0.5$, which is conducive to making more lights smoothly enter the optical system, and controlling the light trend of the optical system to form images smoothly, thereby improving the resolving power of the lens assembly.

In a preferred embodiment of the present disclosure, an absolute value of a distance d5 between an image-side surface of the fifth lens L5 and the diaphragm STO on the optical axis and a total track length TTL of the wide-angle lens assembly satisfies: $0<|d5/TTL|<0.1$. Accordingly, the transition of the light in the vicinity of the diaphragm STO is made smooth, which is conducive to realizing higher resolution of the lens assembly.

In a preferred embodiment of the present disclosure, an effective focal length F5 of the fifth lens L5 and a total effective focal length F of the wide-angle lens assembly satisfy: $-7<F5/F<-2$. Through such settings, the astigmatism produced by the fifth lens L5 can be balanced, thereby reducing the aberrations and improving the resolving power.

In a preferred embodiment of the present disclosure, an effective focal length F6 of the sixth lens L6 and the total effective focal length F of the wide-angle lens assembly satisfy: $1.7<F6/F<3$. Through such settings, the astigmatism produced by the sixth lens L6 can be balanced, thereby reducing the aberrations and improving the resolving power.

In a preferred embodiment of the present disclosure, an effective focal length F9 of the ninth lens L9 and a total effective focal length F of the wide-angle lens assembly satisfy: $-3.5<F9/F<-1$. By reasonably distributing the focal length of the ninth lens and introducing a negative distortion, it helps to balance the positive distortion values produced by the sixth lens L6 and the seventh lens L7, thereby making the degree of deformation of the image small.

In a preferred embodiment of the present disclosure, a combined focal length Fa of the first lens L1 to the fifth lens L5 and a total effective focal length F of the wide-angle lens assembly satisfy: $-2.8<Fa/F<-1$. Through such settings, the refractive powers of the front group of lenses (lenses before the diaphragm) are reasonably distributed, which is conducive to controlling the trend of light to make the light move more smoothly, thereby reducing the sensitivity of the system and improving the imaging quality of the system.

In a preferred embodiment of the present disclosure, a combined focal length Fb of the sixth lens L6 to the tenth lens L10 and the total effective focal length F of the wide-angle lens assembly satisfy: $1.5<Fb/F<2.5$. Through such settings, the refractive powers of the rear group of lenses (lenses subsequent to the diaphragm) are reasonably distributed, which is conducive to controlling the trend of light to make the light move more smoothly, thereby reducing the sensitivity of the system and improving the imaging quality of the system.

In a preferred embodiment of the present disclosure, the combined focal length Fa of the first lens L1 to the fifth lens L5 and the combined focal length Fb of the sixth lens L6 to the tenth lens L10 satisfy: $-1.2<Fa/Fb<-0.5$. Through such settings, the refractive powers of the front group of lenses (lenses before the diaphragm) and the rear group of lenses (lenses subsequent to the diaphragm) are reasonably distributed, which is conducive to controlling the trend of light to make the light move more smoothly, thereby reducing the sensitivity of the system and improving the imaging quality of the system.

In a preferred embodiment of the present disclosure, a maximal aperture D of the wide-angle lens assembly, a total track length TTL of the wide-angle lens assembly and a semi-image height H of the wide-angle lens assembly satisfy: $0<D/TTL/H<0.2$. The maximal aperture of the optical system is controlled, which is conducive to reducing the size, thereby realizing miniaturization.

In a preferred embodiment of the present disclosure, a back focal length BFL of the wide-angle lens assembly and a total track length TTL of the wide-angle lens assembly satisfy: $0.1<BFL/TTL<0.3$, which is conducive to the assembling of the optical lens assembly and avoiding the interference.

In a preferred embodiment of the present disclosure, a focal length F1 of the first lens L1, a radius of curvature R11 of an object-side surface of the first lens L1 and a radius of curvature R12 of an image-side surface of the first lens L1 satisfy: $-2.2<F1/R11+F1/R21<-1.3$. Accordingly, it is possible to enable the first lens L1 to provide sufficient refractive power to the optical system, and make the optical system maintain the characteristics of a large field-of-view at the same time.

In a preferred embodiment of the present disclosure, a combined effective focal length F34 of the third lens L3 and the fourth lens L4 and an effective focal length F of the wide-angle lens assembly satisfy: $1.5<F34/F<2.8$. Accordingly, it helps the optical lens assembly to better balance the field curvature and the chromatic aberration, and helps to improve the resolving power of the lens assembly.

In a preferred embodiment of the present disclosure, an effective focal length F4 of the fourth lens L4 and a radius of curvature R42 of an image-side surface of the fourth lens L4 satisfy: $-0.9<F4/R42<1.2$. Accordingly, the shape of the fourth lens L4 is restricted, which is conducive to eliminating the distortion introduced by the first lens L1 to improve the imaging quality of the optical imaging lens assembly, and at the same time, which is convenient for the processing of the fourth lens L4.

In a preferred embodiment of the present disclosure, an effective focal length F5 of the fifth lens L5 and an effective focal length F6 of the sixth lens L6 satisfy: $-2.8<F5/F6<-0.8$. Accordingly, it helps to realize the thermal compensation of the optical lens assembly, thereby making the optical lens assembly have good temperature performance.

In a preferred embodiment of the present disclosure, a combined effective focal length F78 of the seventh lens L7 and the eighth lens L8 and an effective focal length F of the wide-angle lens assembly satisfy: $2.6<F78/F<7.9$. Accordingly, by reasonably setting the combined focal length of the seventh lens L7 and the eighth lens L8, it helps more light to enter smoothly, which is conducive to improving the illumination.

In a preferred embodiment of the present disclosure, an effective focal length F10 of the tenth lens L10 and an effective focal length F of the wide-angle lens assembly satisfy: $2.0<F10/F<3.7$. A radius of curvature R101 of an object-side surface of the tenth lens L10, a radius of curvature R102 of an image-side surface of the tenth lens L10 and the effective focal length F of the wide-angle lens assembly satisfy: $-0.5<(R101+R102)/F<1.1$. Accordingly, the tenth lens L10 is reasonably set, which is conducive to correcting the astigmatism, field curvature and distortion produced by the lenses at the front part, thereby realizing the correction of the synthetic aberration and improving the imaging quality.

In a preferred embodiment of the present disclosure, an effective focal length F of the wide-angle lens assembly and an entrance pupil diameter ENPD of the wide-angle lens assembly satisfy: $1.6<F/ENPD<1.9$. Accordingly, a large aperture can be realized, thereby increasing the light amount, and improving the imaging brightness and contrast.

In a preferred embodiment of the present disclosure, a radius of curvature R31 of an object-side surface of the third lens L3 and a radius of curvature R32 of the image-side surface of the third lens L3 satisfy: $-2.6<(R31-R32)/(R31+R32)<0.9$. Accordingly, by effectively controlling the radii of curvature of the third lens L3, it helps to ensure that the incident light is relatively smooth when the light emitted from the third lens L3 is incident on the object-side surface of the fourth lens L4, and to reduce the tolerance sensitivity of the optical lens assembly.

In a preferred embodiment of the present disclosure, a radius of curvature R71 of the object-side surface of the seventh lens L7 and a radius of curvature R72 of an image-side surface of the seventh lens L7 satisfy: $0.1<(R71-R72)/(R71+R72)<3.0$. Accordingly, the radii of curvature of the seventh lens L7 are restricted to a certain range, which is conducive to reducing the processing difficulty of the seventh lens L7 and is helpful to reduce the aberration of the edge field of view.

In addition, the wide-angle lens assembly according to embodiments of the present disclosure may be of a symmetrical structure, thereby realizing the compact structure, which can correct the comatic aberration, astigmatism and field curvature, and is conducive to improving the imaging quality.

The wide-angle lens assembly in embodiments of the present disclosure uses ten lenses. By the corporation of the shapes and positive and negative refractive powers of the lenses, and reasonable setting of the parameters, the wide-angle lens assembly can achieve a large aperture (FNO≤1.8), a large field-of-view (FOV≥160°, and/or high resolution (35 million pixels), and at the same time, can take into account at least one of the beneficial effects such as: miniaturization, small size, low distortions (the absolute value of an F-Theta distortion is less than 5%), high relative illumination (RI≥50%) and not being out of focus under high and low temperatures.

The wide-angle lens assembly in four embodiments of the present disclosure is described below in detail in combination with the accompanying drawings and the tables. In the following embodiments, the diaphragm STO is denoted as one surface and the image plane IMA is denoted as one surface.

Particularly, the parameters conforming to the above conditional expressions in each embodiment are shown in Table 1 below:

TABLE 1

| Conditional expression | Embodiment 1 | Embodiment 2 | Embodiment 3 | Embodiment 4 | Embodiment 5 |
|---|---|---|---|---|---|
| $-2.5 < D1/F1 < -1.7$ | −2.121 | −1.920 | −2.417 | −1.914 | −2.712 |
| $-2.5 < F1/F < -1$ | −1.734 | −2.442 | −1.447 | −2.422 | −1.625 |
| $-5 < F2/F < -2$ | −4.945 | −3.254 | −2.895 | −3.164 | −3.294 |
| $-1.6 < F12/F < -0.5$ | −1.138 | −1.219 | −0.779 | −1.190 | −0.908 |
| $0 < |d5/TTL| < 0.1$ | 0.002 | 0.025 | 0.008 | 0.016 | 0.004 |
| $-7 < F5/F < -2$ | −4.333 | −2.580 | −4.075 | −2.365 | −3.039 |
| $1.7 < F6/F < 3$ | 2.307 | 2.074 | 2.424 | 1.994 | 2.371 |
| $-3.5 < F9/F < -1$ | −1.338 | −3.181 | −1.910 | −2.595 | −2.805 |
| $-2.8 < Fa/F < -1$ | −2.322 | −1.275 | −2.278 | −1.131 | −1.440 |
| $1.5 < Fb/F < 2.5$ | 2.395 | 1.961 | 2.266 | 1.917 | 2.016 |
| $-1.2 < Fa/Fb < -0.5$ | −0.970 | −0.650 | −1.005 | −0.590 | −0.714 |
| $0 < D/TTL/H < 0.2$ | 0.110 | 0.133 | 0.105 | 0.131 | 0.111 |
| $0.1 < BFL/TTL < 0.3$ | 0.136 | 0.132 | 0.130 | 0.131 | 0.163 |
| $-2.2 < F1/R1 + F1/R2 < -1.3$ | −1.688 | −1.829 | −1.597 | −1.858 | −1.663 |
| $1.5 < F34/F < 2.8$ | 2.427 | 2.505 | 1.722 | 2.501 | 1.976 |
| $-0.9 < F4/R42 < 1.2$ | −0.616 | −0.411 | −0.422 | 0.939 | −0.543 |
| $-2.8 < F5/F6 < -0.8$ | −1.878 | −1.244 | −1.681 | −1.186 | −1.282 |
| $2.6 < F78/F < 7.9$ | 2.959 | 7.462 | 3.313 | 5.229 | 4.128 |
| $2.0 < F10/F < 3.7$ | 2.306 | 2.972 | 3.001 | 2.899 | 3.400 |
| $-0.5 < (R101 + R102)/F < 1.1$ | 0.812 | −0.131 | 0.216 | −0.076 | −0.274 |
| $1.6 < F/ENPD < 1.9$ | 1.80 | 1.70 | 1.80 | 1.70 | 1.8 |
| $-2.6 < (R31 − R32)/(R31 + R32) < 0.9$ | −2.408 | 0.576 | 0.297 | 0.560 | 0.360 |
| $0.1 < (R71 − R72)/(R71 + R72) < 3.0$ | 0.337 | 2.783 | 0.340 | 2.846 | 0.234 |

In embodiments of the present disclosure, the aspheric lens of the wide-angle lens assembly satisfies the following formula:

$$z = \frac{ch^2}{1 + \sqrt{1 - (1+k)c^2 h^2}} + A_4 h^4 + A_6 h^6 + A_8 h^8 + A_{10} h^{10} + A_{12} h^{12} + A_{14} h^{14} + A_{16} h^{16} + \ldots$$

In the above formula, z is the axis-component of the displacement of the surface from the aspheric vertex, when the surface is at height h from the optical axis; c is the curvature of an aspheric surface at the vertex thereof; k is the conic coefficient; and $A_4, A_6, A_8, A_{10}, A_{12}, A_{14}, A_{16} \ldots$ are respectively represent the fourth-order coefficient, sixth-order coefficient, eighth-order coefficient, tenth-order coefficient, twelfth-order coefficient, fourteenth-order coefficient, sixteenth-order coefficient . . . of the aspheric surface.

Embodiment 1

As shown in FIG. 1, FIG. 1 is a schematic diagram of an optical structure of a wide-angle lens assembly according to Embodiment 1 of the present disclosure. In this embodiment:

A first lens L1 is a convex-concave lens having a negative refractive power.

A second lens L2 is a convex-concave lens having a negative refractive power.

A third lens L3 is a concave-concave lens having a negative refractive power.

A fourth lens L4 is a convex-convex lens having a positive refractive power.

A fifth lens L5 is a concave-convex lens having a negative refractive power.

A sixth lens L6 is a convex-convex lens having a positive refractive power.

A seventh lens L7 is a convex-concave lens having a negative refractive power.

An eighth lens L8 is a convex-convex lens having a positive refractive power.

A ninth lens L9 is a concave-concave lens having a negative refractive power.

A tenth lens L10 is a convex-convex lens having a positive refractive power.

The seventh lens L7 and the eighth lens L8 are cemented. The second lens L2, the fifth lens L5 and the tenth lens L10 are glass aspheric lenses, and the other lenses are glass spherical lenses.

In this embodiment, the radius of curvature R, the thickness d, the refractive index Nd and the Abbe number Vd of each surface of the wide-angle lens assembly are shown in Table 2:

TABLE 2

| surface number | surface type | radius of curvature R | thickness d | refractive index Nd | abbe number Vd |
|---|---|---|---|---|---|
| 1 | spherical | 15.749 | 0.60 | 1.92 | 20.9 |
| 2 | spherical | 3.401 | 1.14 | | |
| 3 | aspheric | 9.200 | 0.80 | 1.77 | 49.6 |
| 4 | aspheric | 4.715 | 1.74 | | |
| 5 | spherical | −7.028 | 0.60 | 1.50 | 81.6 |
| 6 | spherical | 17.013 | 0.08 | | |
| 7 | spherical | 8.015 | 2.89 | 1.92 | 20.9 |
| 8 | spherical | −7.228 | 0.40 | | |
| 9 | aspheric | −3.604 | 1.04 | 1.85 | 23.8 |
| 10 | aspheric | −6.331 | 0.04 | | |
| 11 (STO) | spherical | Infinity | 0.04 | | |
| 12 | spherical | 20.413 | 2.39 | 1.60 | 65.5 |
| 13 | spherical | −4.481 | 0.08 | | |
| 14 | spherical | 6.942 | 0.60 | 1.81 | 25.5 |
| 15 | spherical | 3.445 | 3.26 | 1.50 | 81.6 |
| 16 | spherical | −4.718 | 0.12 | | |
| 17 | spherical | −5.572 | 0.60 | 1.81 | 25.5 |
| 18 | spherical | 6.728 | 0.34 | | |
| 19 | aspheric | 9.344 | 2.85 | 1.50 | 81.6 |
| 20 | aspheric | −4.243 | 0.19 | | |
| 21 | spherical | Infinity | 0.50 | 1.52 | 64.2 |
| 22 | spherical | Infinity | 2.42 | | |
| IMA | image plane | Infinity | — | — | — |

In this embodiment, the K values and the coefficients of the aspheric surfaces of the wide-angle lens assembly are shown in Table 3:

TABLE 3

| surface number | K value | A4 | A6 | A8 | A10 | A12 | A14 | A16 |
|---|---|---|---|---|---|---|---|---|
| 3 | 0 | 7.58E−03 | −6.76E−04 | 1.01E−04 | −1.25E−05 | 1.00E−06 | −4.46E−08 | 3.83E−10 |
| 4 | 0 | 9.77E−03 | −9.07E−04 | 3.01E−04 | −6.89E−05 | 1.05E−05 | −8.59E−07 | 2.28E−08 |
| 9 | 0 | 5.85E−03 | 9.87E−04 | −3.45E−04 | 8.79E−05 | −1.46E−05 | 1.31E−06 | −4.89E−08 |
| 10 | 0 | 5.83E−03 | 6.24E−04 | −1.56E−04 | 3.98E−05 | −6.86E−06 | 6.37E−07 | −2.50E−08 |
| 19 | 0 | −7.04E−04 | 1.44E−04 | −4.77E−05 | 7.23E−06 | −5.46E−07 | 4.26E−09 | 1.05E−09 |
| 20 | 0 | 3.77E−03 | −2.43E−04 | 5.25E−05 | −8.63E−06 | 7.98E−07 | −3.84E−08 | 6.35E−10 |

As shown in FIG. 1 and Tables 1-3, ten lenses are used in wide-angle lens assembly of this embodiment. By cooperation of the shapes and positive and negative refractive powers of the lenses, and reasonable setting of the parameters, the wide-angle lens assembly can achieve a large aperture (FNO≤1.8), a large field-of-view (FOV≥160°, and/or high resolution (35 million pixels), and at the same time, can take into account at least one of the following beneficial effects such as: miniaturization, small size, low distortions (the absolute value of an F-Theta distortion is less than 5%), a high relative illumination (RI≥50%) and not being out of focus under high and low temperatures.

Embodiment 2

Figure 2:
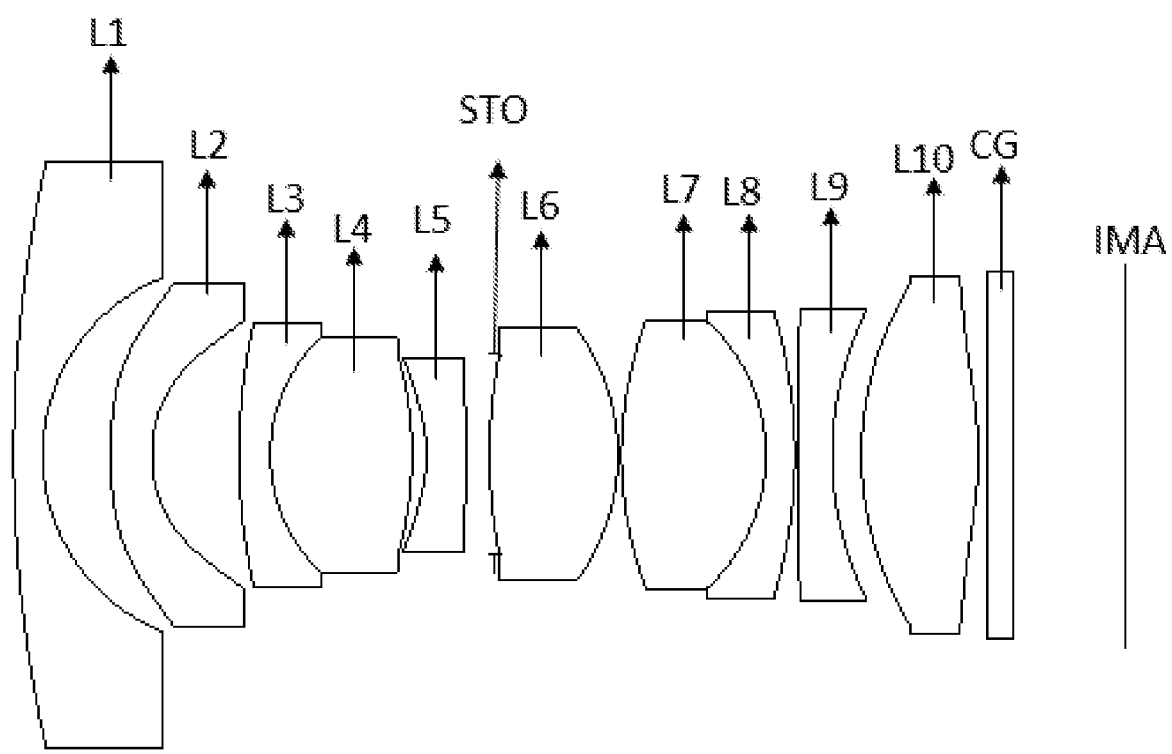
FIG. 2 is a schematic diagram of an optical structure of a wide-angle lens assembly according to Embodiment 2 of the present disclosure.

As shown in FIG. 2, FIG. 2 is a schematic diagram of an optical structure of a wide-angle lens assembly according to Embodiment 2 of the present disclosure. In this embodiment:

A first lens L1 is a convex-concave lens having a negative refractive power.

A second lens L2 is a convex-concave lens having a negative refractive power.

A third lens L3 is a convex-concave lens having a negative refractive power.

A fourth lens L4 is a convex-convex lens having a positive refractive power.

A fifth lens L5 is a concave-convex lens having a negative refractive power.

A sixth lens L6 is a convex-convex lens having a positive refractive power.

A seventh lens L7 is a convex-convex lens having a positive refractive power.

An eighth lens L8 is a concave-convex lens having a negative refractive power.

A ninth lens L9 is a convex-concave lens having a negative refractive power.

A tenth lens L10 is a convex-convex lens having a positive refractive power.

The third lens L3 and the fourth lens L4 are cemented, and the seventh lens L7 and the eighth lens L8 are cemented. The second lens L2, the fifth lens L5 and the tenth lens L10 are glass aspheric lenses, and the other lenses are glass spherical lenses.

In this embodiment, the radius of curvature R, the thickness d, the refractive index Nd and the Abbe number Vd of each surface of the wide-angle lens assembly are shown in Table 4:

TABLE 4

| surface number | surface type | radius of curvature R | thickness d | refractive index Nd | abbe number Vd |
|---|---|---|---|---|---|
| 1 | spherical | 27.911 | 0.60 | 1.73 | 54.7 |
| 2 | spherical | 3.948 | 1.41 | | |
| 3 | aspheric | 12.600 | 0.85 | 1.50 | 81.6 |
| 4 | aspheric | 3.086 | 1.80 | | |
| 5 | spherical | 12.518 | 0.65 | 1.92 | 18.9 |
| 6 | spherical | 3.364 | 2.93 | 1.85 | 23.8 |
| 7 | spherical | −7.511 | 0.30 | | |
| 8 | aspheric | −3.143 | 0.85 | 1.81 | 40.7 |
| 9 | aspheric | −8.343 | 0.57 | | |
| 10 (STO) | spherical | Infinity | −0.11 | | |
| 11 | spherical | 10.984 | 2.66 | 1.62 | 57.0 |
| 12 | spherical | −4.409 | 0.08 | | |
| 13 | spherical | 7.929 | 2.98 | 1.50 | 81.6 |
| 14 | spherical | −3.738 | 0.60 | 1.85 | 23.8 |
| 15 | spherical | −10.326 | 0.08 | | |
| 16 | spherical | 197.743 | 0.70 | 1.83 | 37.2 |
| 17 | spherical | 6.702 | 0.61 | | |
| 18 | aspheric | 6.803 | 2.41 | 1.50 | 81.6 |
| 19 | aspheric | −7.808 | 0.20 | | |
| 20 | spherical | Infinity | 0.50 | 1.52 | 64.2 |
| 21 | spherical | Infinity | 2.32 | | |
| IMA | image plane | Infinity | — | — | — |

In this embodiment, the K values and the coefficients of the aspheric surfaces of the wide-angle lens assembly are shown in Table 5:

TABLE 5

| surface number | K value | A4 | A6 | A8 | A10 | A12 | A14 | A16 |
|---|---|---|---|---|---|---|---|---|
| 3 | 0 | 1.64E−02 | −2.62E−03 | 3.87E−04 | −4.23E−05 | 2.93E−06 | −1.17E−07 | 2.03E−09 |
| 4 | 0 | 1.90E−02 | −3.17E−03 | 3.73E−04 | −1.10E−05 | −7.68E−06 | 1.04E−06 | −4.85E−08 |
| 8 | 0 | 1.91E−02 | −1.63E−03 | 1.56E−04 | −5.79E−06 | 1.84E−07 | −3.57E−08 | −4.14E−10 |
| 9 | 0 | 1.40E−02 | −1.12E−03 | 1.23E−04 | −8.07E−06 | 4.84E−07 | −3.39E−08 | −7.42E−20 |
| 18 | 0 | −2.69E−04 | 2.41E−04 | −4.58E−05 | 4.27E−06 | −1.58E−07 | −3.61E−09 | 2.82E−10 |
| 19 | 0 | 4.43E−03 | −3.73E−04 | 1.20E−04 | −2.22E−05 | 2.16E−06 | −1.09E−07 | 2.22E−09 |

As shown in FIG. 2 and Tables 1 and 4-5, ten lenses are used in wide-angle lens assembly of this embodiment. By the cooperation of the shapes and positive and negative refractive powers of the lenses, and reasonable setting of the parameters, the wide-angle lens assembly can achieve a large aperture (FNO≤1.8), a large field-of-view)(FOV≥160°, and/or high resolution (35 million pixels), and at the same time, can take into account at least one of the following beneficial effects such as: miniaturization, small size, low distortions (the absolute value of an F-Theta distortion is less than 5%), a high relative illumination (RI≥50%) and not being out of focus under high and low temperatures.

Embodiment 3

Figure 3:
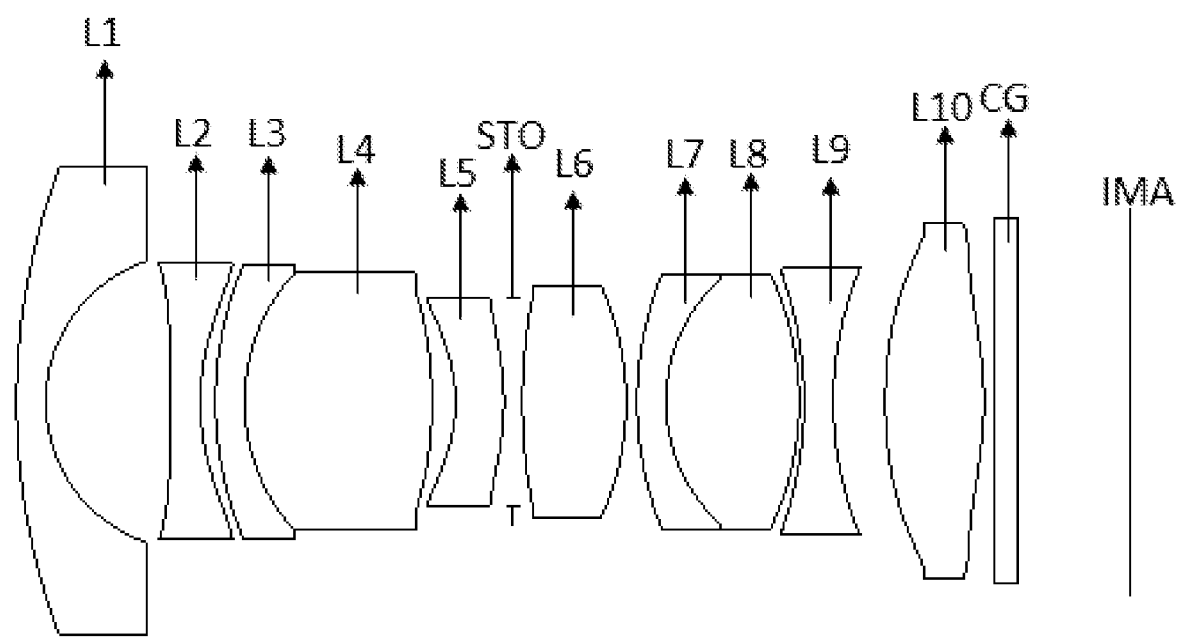
FIG. 3 is a schematic diagram of an optical structure of a wide-angle lens assembly according to Embodiment 3 of the present disclosure.

As shown in FIG. 3, FIG. 3 is a schematic diagram of an optical structure of a wide-angle lens assembly according to Embodiment 3 of the present disclosure. In this embodiment:

A first lens L1 is a convex-concave lens having a negative refractive power.
A second lens L2 is a concave-concave lens having a negative refractive power.
A third lens L3 is a convex-concave lens having a negative refractive power.
A fourth lens L4 is a convex-convex lens having a positive refractive power.
A fifth lens L5 is a concave-convex lens having a negative refractive power.
A sixth lens L6 is a convex-convex lens having a positive refractive power.
A seventh lens L7 is a convex-concave lens having a negative refractive power.
An eighth lens L8 is a convex-convex lens having a positive refractive power.
A ninth lens L9 is a concave-concave lens having a negative refractive power.
A tenth lens L10 is a convex-convex lens having a positive refractive power.

The third lens L3 and the fourth lens L4 are cemented, and the seventh lens L7 and the eighth lens L8 are cemented. The second lens L2, the fifth lens L5 and the tenth lens L10 are glass aspheric lenses, and the other lenses are glass spherical lenses.

In this embodiment, the radius of curvature R, the thickness d, the refractive index Nd and the Abbe number Vd of each surface of the wide-angle lens assembly are shown in Table 6:

TABLE 6

| surface number | surface type | radius of curvature R | thick-ness d | refractive index Nd | abbe number Vd |
|---|---|---|---|---|---|
| 1 | spherical | 13.682 | 0.60 | 2.00 | 28.3 |
| 2 | spherical | 3.069 | 2.59 | | |
| 3 | aspheric | −38.231 | 0.60 | 1.50 | 81.6 |
| 4 | aspheric | 4.490 | 0.31 | | |
| 5 | spherical | 7.245 | 0.60 | 1.95 | 18.0 |
| 6 | spherical | 3.930 | 3.87 | 1.92 | 24.0 |
| 7 | spherical | −7.890 | 0.49 | | |
| 8 | aspheric | −3.063 | 1.00 | 1.85 | 40.1 |
| 9 | aspheric | −5.154 | 0.18 | | |
| 10 (STO) | spherical | Infinity | 0.20 | | |
| 11 | spherical | 11.129 | 2.15 | 1.59 | 68.6 |
| 12 | spherical | −5.790 | 0.22 | | |
| 13 | spherical | 6.954 | 0.60 | 1.75 | 25.0 |
| 14 | spherical | 3.422 | 2.76 | 1.50 | 81.6 |
| 15 | spherical | −6.079 | 0.10 | | |
| 16 | spherical | −7.884 | 0.60 | 1.69 | 31.2 |
| 17 | spherical | 7.137 | 1.07 | | |
| 18 | aspheric | 8.935 | 2.04 | 1.50 | 81.6 |
| 19 | aspheric | −7.145 | 0.19 | | |
| 20 | spherical | Infinity | 0.50 | 1.52 | 64.2 |
| 21 | spherical | Infinity | 2.30 | | |
| IMA | image plane | Infinity | — | — | — |

In this embodiment, the K values and the coefficients of the aspheric surfaces of the wide-angle lens assembly are shown in Table 7:

TABLE 7

| surface number | K value | A4 | A6 | A8 | A10 | A12 | A14 | A16 |
|---|---|---|---|---|---|---|---|---|
| 3 | 0 | −1.15E−03 | −5.67E−04 | 2.74E−04 | −7.09E−05 | 9.66E−06 | −6.61E−07 | 1.68E−08 |
| 4 | 0 | −4.17E−03 | −1.34E−04 | 4.70E−05 | −2.02E−05 | 3.92E−06 | −3.77E−07 | 1.39E−08 |
| 8 | 0 | 1.13E−02 | 6.47E−04 | −2.20E−04 | 5.70E−05 | −7.74E−06 | 5.12E−07 | −5.93E−09 |
| 9 | 0 | 7.71E−03 | −1.13E−04 | 2.42E−04 | −1.16E−04 | 2.85E−05 | −3.58E−06 | 1.80E−07 |
| 18 | 0 | 1.13E−03 | 1.56E−04 | −4.17E−05 | 7.31E−06 | −9.06E−07 | 6.10E−08 | −1.77E−09 |
| 19 | 0 | 4.24E−03 | 7.62E−05 | −1.10E−05 | 1.19E−06 | −1.67E−07 | 9.62E−09 | −2.95E−10 |

As shown in FIG. 3 and Tables 1 and 6-7, ten lenses are used in wide-angle lens assembly of this embodiment. By the cooperation of the shapes and positive and negative refractive powers of the lenses, and reasonable setting of the parameters, the wide-angle lens assembly can achieve a large aperture (FNO≤1.8), a large field-of-view)(FOV≥160°, and/or high resolution (35 million pixels), and at the same time, can take into account at least one of the following beneficial effects such as: miniaturization, small size, low distortions (the absolute value of an F-Theta distortion is less than 5%), a high relative illumination (RI≥50%) and not being out of focus under high and low temperatures.

Embodiment 4

Figure 4:
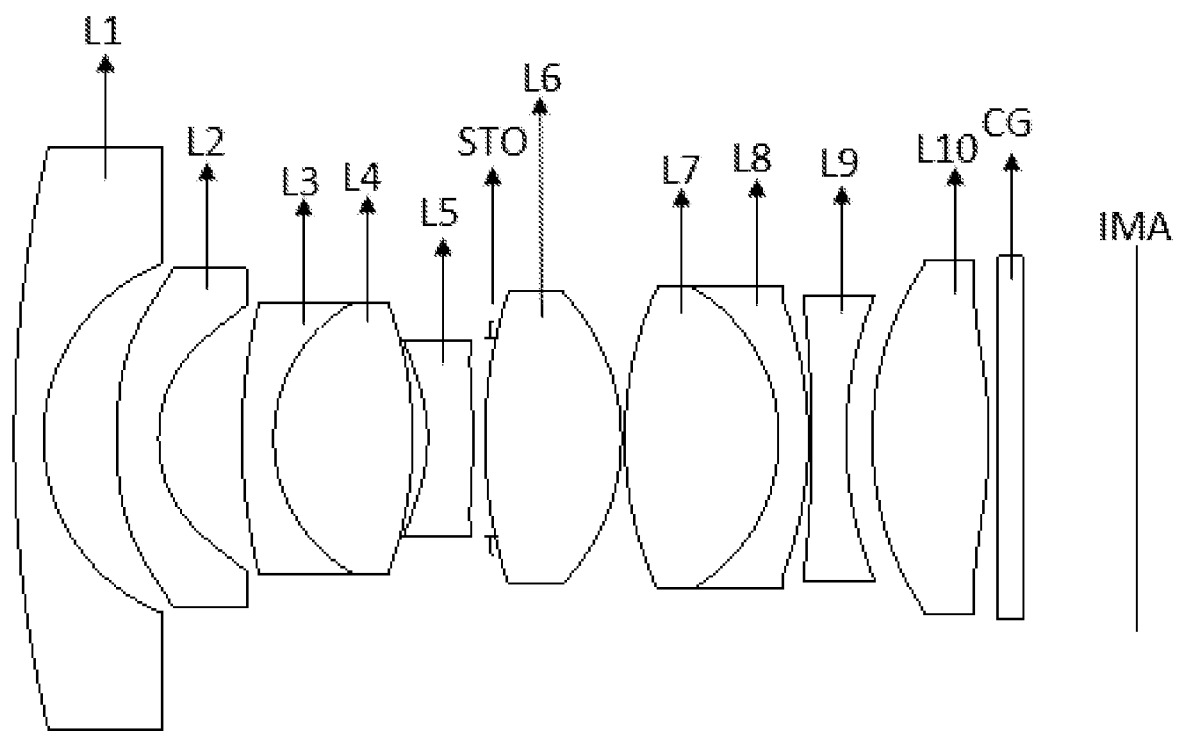
FIG. 4 is a schematic diagram of an optical structure of a wide-angle lens assembly according to Embodiment 4 of the present disclosure.

As shown in FIG. 4, FIG. 4 is a schematic diagram of an optical structure of a wide-angle lens assembly according to Embodiment 4 of the present disclosure. In this embodiment:

A first lens L1 is a convex-concave lens having a negative refractive power.
A second lens L2 is a convex-concave lens having a negative refractive power.
A third lens L3 is a convex-concave lens having a negative refractive power.
A fourth lens L4 is a convex-convex lens having a positive refractive power.
A fifth lens L5 is a concave-convex lens having a negative refractive power.
A sixth lens L6 is a convex-convex lens having a positive refractive power.
A seventh lens L7 is a convex-convex lens having a positive refractive power.
An eighth lens L8 is a concave-convex lens having a negative refractive power.
A ninth lens L9 is a concave-concave lens having a negative refractive power.
A tenth lens L10 is a convex-convex lens having a positive refractive power.

The third lens L3 and the fourth lens L4 are cemented, and the seventh lens L7 and the eighth lens L8 are cemented. The second lens L2, the fifth lens L5, the sixth lens L6, and the tenth lens L10 are glass aspheric lenses, and the other lenses are glass spherical lenses.

In this embodiment, the radius of curvature R, the thickness d, the refractive index Nd and the Abbe number Vd of each surface of the wide-angle lens assembly are shown in Table 8:

TABLE 8

| surface number | surface type | radius of curvature R | thickness d | refractive index Nd | abbe number Vd |
|---|---|---|---|---|---|
| 1 | spherical | 25.957 | 0.60 | 1.73 | 54.7 |
| 2 | spherical | 3.860 | 1.51 | | |
| 3 | aspheric | 13.295 | 0.85 | 1.50 | 81.6 |
| 4 | aspheric | 3.052 | 1.72 | | |
| 5 | spherical | 11.297 | 0.65 | 1.92 | 18.9 |

TABLE 8-continued

| surface number | surface type | radius of curvature R | thickness d | refractive index Nd | abbe number Vd |
|---|---|---|---|---|---|
| 6 | spherical | 3.183 | 2.85 | 1.85 | 23.8 |
| 7 | spherical | −7.870 | 0.31 | | |
| 8 | aspheric | −3.008 | 0.93 | 1.81 | 40.7 |
| 9 | aspheric | −8.694 | 0.37 | | |
| 10 (STO) | spherical | Infinity | −0.13 | | |
| 11 | aspheric | 9.591 | 2.80 | 1.62 | 57.0 |
| 12 | aspheric | −4.312 | 0.07 | | |
| 13 | spherical | 7.463 | 3.16 | 1.50 | 81.6 |
| 14 | spherical | −3.582 | 0.60 | 1.85 | 23.8 |
| 15 | spherical | −7.930 | 0.08 | | |
| 16 | spherical | −23.010 | 0.70 | 1.83 | 37.2 |
| 17 | spherical | 7.575 | 0.54 | | |
| 18 | aspheric | 6.773 | 2.40 | 1.50 | 81.6 |
| 19 | aspheric | −7.343 | 0.19 | | |
| 20 | spherical | Infinity | 0.50 | 1.52 | 64.2 |
| 21 | spherical | Infinity | 2.31 | | |
| IMA | image plane | Infinity | — | — | — |

In this embodiment, the K values and the coefficients of the aspheric surfaces of the wide-angle lens assembly are shown in Table 9:

TABLE 9

| surface number | K value | A4 | A6 | A8 | A10 | A12 | A14 | A16 |
|---|---|---|---|---|---|---|---|---|
| 3 | 0.000 | 1.59E−02 | −2.58E−03 | 3.79E−04 | −4.13E−05 | 2.87E−06 | −1.17E−07 | 2.07E−09 |
| 4 | −0.011 | 1.82E−02 | −3.11E−03 | 3.71E−04 | −1.38E−05 | −7.41E−06 | 1.03E−06 | −4.79E−08 |
| 8 | −0.003 | 2.14E−02 | −1.97E−03 | 2.03E−04 | −5.80E−06 | 6.33E−08 | −2.14E−07 | 2.83E−08 |
| 9 | 0.122 | 1.52E−02 | −1.33E−03 | 1.45E−04 | −9.18E−06 | 6.08E−07 | −1.49E−08 | −1.43E−08 |
| 11 | 0.000 | −7.84E−03 | 1.04E−02 | −7.37E−03 | 2.88E−03 | −6.24E−04 | 6.89E−05 | −2.95E−06 |
| 12 | 0.000 | −4.90E−03 | 4.48E−03 | −2.21E−03 | 6.07E−04 | −9.31E−05 | 7.39E−06 | −2.33E−07 |
| 18 | 0.133 | −1.75E−04 | 1.65E−04 | −2.08E−05 | 7.49E−07 | 1.06E−07 | −1.24E−08 | 3.74E−10 |
| 19 | 0.030 | 4.72E−03 | −2.73E−04 | 8.36E−05 | −1.45E−05 | 1.35E−06 | −6.59E−08 | 1.31E−09 |

As shown in FIG. 4 and Tables 1 and 8-9, ten lenses are used in this embodiment. By cooperation of the shapes and positive and negative refractive powers of the lenses, and reasonable setting of the parameters, the wide-angle lens assembly can achieve a large aperture (FNO≤1.8), a large field-of-view)(FOV≥160°, and/or high resolution (35 million pixels), and at the same time, can take into account at least one of the beneficial effects such as: miniaturization, small size, low distortions (the absolute value of an F-Theta distortion is less than 5%), a high relative illumination (RI≥50%) and not being out of focus under high and low temperatures.

Embodiment 5

Figure 5:
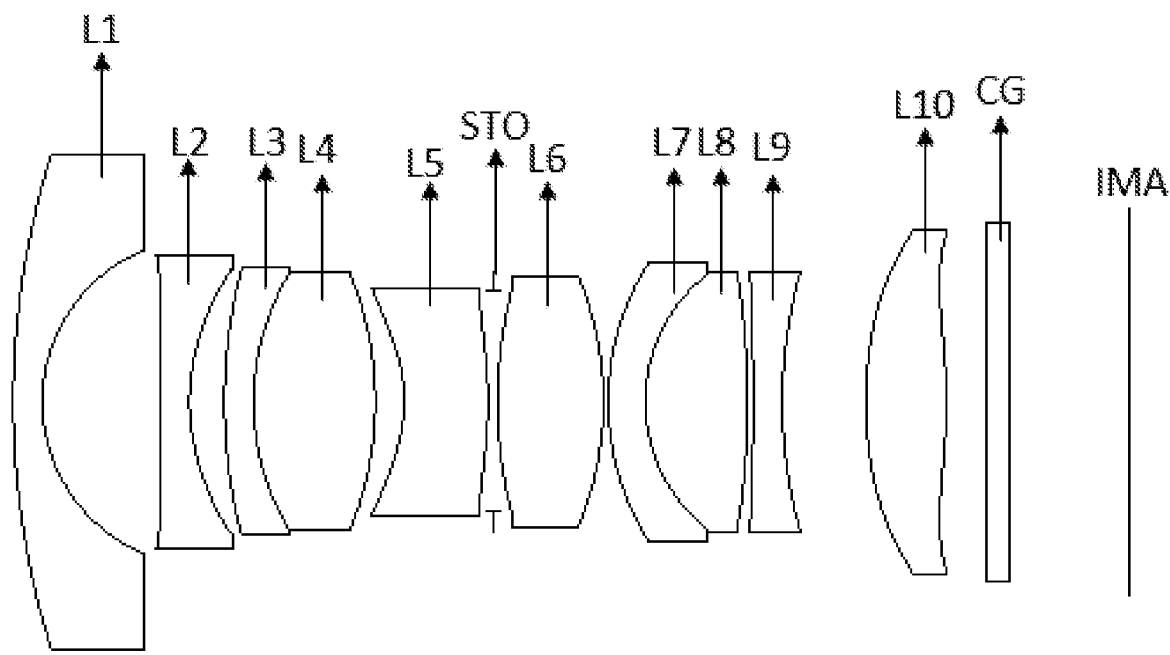
FIG. 5 is a schematic diagram of an optical structure of a wide-angle lens assembly according to Embodiment 5 of the present disclosure.

As shown in FIG. 5, FIG. 5 is a schematic diagram of an optical structure of a wide-angle lens assembly according to Embodiment 5 of the present disclosure. In this embodiment:

A first lens L1 is a convex-concave lens having a negative refractive power.
A second lens L2 is a convex-concave lens having a negative refractive power.
A third lens L3 is a convex-concave lens having a negative refractive power.

A fourth lens L4 is a convex-convex lens having a positive refractive power.

A fifth lens L5 is a concave-convex lens having a negative refractive power.

A sixth lens L6 is a convex-convex lens having a positive refractive power.

A seventh lens L7 is a convex-concave lens having a negative refractive power.

An eighth lens L8 is a convex-convex lens having a positive refractive power.

A ninth lens L9 is a concave-concave lens having a negative refractive power.

A tenth lens L10 is a convex-convex lens having a positive refractive power.

The third lens L3 and the fourth lens L4 are cemented, the seventh lens L7 and the eighth lens L8 are cemented. The second lens L2, the fifth lens L5, the sixth lens L6, and the ninth lens L9, and the tenth lens L10 are glass aspheric lenses, and the other lenses are glass spherical lenses.

In this embodiment, the radius of curvature R, the thickness d, the refractive index Nd and the Abbe number Vd of each surface of the wide-angle lens assembly are shown in Table 10:

TABLE 10

| Surface number | surface type | radius of curvature R | thickness d | refractive index Nd | abbe number Vd |
|---|---|---|---|---|---|
| 1 | spherical | 16.967 | 0.60 | 1.91 | 35.3 |
| 2 | spherical | 3.390 | 2.43 | | |
| 3 | aspheric | 27.621 | 0.60 | 1.50 | 81.6 |
| 4 | aspheric | 4.029 | 0.72 | | |
| 5 | spherical | 10.939 | 0.60 | 2.00 | 19.3 |
| 6 | spherical | 5.146 | 2.51 | 1.85 | 25.2 |
| 7 | spherical | −6.940 | 0.60 | | |
| 8 | aspheric | −3.186 | 1.72 | 1.69 | 53.2 |
| 9 | aspheric | −8.095 | 0.10 | | |
| 10(STO) | spherical | Infinity | 0.10 | | |
| 11 | aspheric | 9.241 | 2.19 | 1.59 | 68.6 |
| 12 | aspheric | −6.685 | 0.10 | | |
| 13 | spherical | 5.397 | 0.76 | 1.85 | 25.2 |
| 14 | spherical | 3.349 | 2.11 | 1.50 | 81.6 |
| 15 | spherical | −16.509 | 0.12 | | |
| 16 | aspheric | −53.947 | 0.60 | 2.00 | 25.5 |
| 17 | aspheric | 9.784 | 1.73 | | |
| 18 | aspheric | 8.383 | 1.66 | 1.50 | 81.6 |
| 19 | aspheric | −11.080 | 0.82 | | |
| 20 | spherical | Infinity | 0.50 | 1.52 | 64.2 |
| 21 | spherical | Infinity | 2.43 | | |
| IMA | image plane | Infinity | — | — | — |

In this embodiment, the K values and the coefficients of the aspheric surfaces of the wide-angle lens assembly are shown in Table 11:

TABLE 11

| surface number | K value | A4 | A6 | A8 | A10 | A12 | A14 | A16 |
|---|---|---|---|---|---|---|---|---|
| 3 | 0.000 | −5.91E−03 | 8.97E−04 | −1.59E−04 | 2.55E−05 | −3.00E−06 | 2.02E−07 | −5.76E−09 |
| 4 | 0.426 | −7.86E−03 | 9.26E−04 | −1.88E−04 | 3.54E−05 | −5.04E−06 | 4.12E−07 | −1.43E−08 |
| 8 | −0.160 | 9.84E−03 | 1.83E−04 | −7.14E−05 | 1.89E−05 | −2.02E−06 | 1.04E−07 | −6.03E−10 |
| 9 | 0.414 | 5.44E−03 | −2.94E−05 | 2.50E−05 | −1.10E−05 | 2.98E−06 | −4.46E−07 | 2.76E−08 |
| 11 | 0.000 | −4.42E−05 | 1.46E−05 | −3.99E−06 | 7.33E−08 | 1.17E−07 | −1.87E−08 | 8.40E−10 |
| 12 | 0.000 | −4.72E−05 | 9.32E−06 | −2.62E−06 | 1.21E−07 | 7.18E−08 | −1.57E−08 | 9.48E−10 |
| 16 | 0.000 | −9.71E−05 | 3.27E−06 | 8.88E−07 | −3.58E−08 | −1.70E−08 | −8.44E−10 | 2.81E−10 |
| 17 | 0.000 | −9.13E−05 | 5.12E−06 | 3.93E−07 | 8.81E−09 | −1.09E−08 | −1.84E−09 | 2.99E−10 |
| 18 | 1.255 | 5.47E−04 | 1.40E−04 | −2.59E−05 | 3.68E−06 | −3.39E−07 | 1.65E−08 | −3.67E−10 |
| 19 | 2.467 | 3.32E−03 | 1.91E−04 | −3.52E−05 | 6.62E−06 | −6.95E−07 | 3.51E−08 | −7.42E−10 |

As shown in FIG. 5 and Tables 1 and 10-11, ten lenses are used in the wide-angle lens assembly of this embodiment. By cooperation of the shapes and positive and negative refractive powers of the lenses, and reasonable setting of the parameters, the wide-angle lens assembly can achieve a large aperture (FNO≤1.8), a large field-of-view (FOV≥160°), and/or high resolution (35 million pixels), and at the same time, can take into account at least one of the following beneficial effects such as: miniaturization, small size, low distortions (the absolute value of an F-Theta distortion is less than 5%), a high relative illumination (RI≥50%) and not being out of focus under high and low temperatures.

The foregoing is only preferred embodiments of the present disclosure, and is not used to limit the scope of the present disclosure. Any modifications, equivalent substitutions, improvements, etc. made within the spirit and principles of the present disclosure shall fall within the scope of protection of the present disclosure.

What is claimed is:

1. A wide-angle lens assembly, comprising, sequentially along an optical axis from an object side to an image side: a first lens, a second lens, a third lens, a fourth lens, a fifth lens, a sixth lens, a seventh lens, an eighth lens, a ninth lens and a tenth lens, wherein the first lens, the second lens, the third lens, the fifth lens and the ninth lens each has a negative refractive power;

the fourth lens, the sixth lens and the tenth lens each has a positive refractive power; and a refractive power of the seventh lens and a refractive power of the eighth lens are positive-negative opposite, wherein a combined focal length Fa of the first lens to the fifth lens and a combined focal length Fb of the sixth lens to the tenth lens satisfy: $-1.2 < Fa/Fb < -0.5$.

2. The wide-angle lens assembly according to claim 1, wherein the first lens is a convex-concave lens;

image-side surfaces of the second lens, the third lens and the ninth lens are concave;

the fourth lens, the sixth lens and the tenth lens are convex-convex lenses;

the fifth lens is a concave-convex lens;

an object-side surface of the seventh lens is convex; and an image-side surface of the eighth lens is convex.

3. The wide-angle lens assembly according to claim 1, wherein a maximal aperture D1 of the first lens and an effective focal length F1 of the first lens satisfy: $-2.5 < D1/F1 < -1.7$.

4. The wide-angle lens assembly according to claim 1, wherein an effective focal length F1 of the first lens and a total effective focal length F of the wide-angle lens assembly satisfy: $-2.5 < F1/F < -1$.

5. The wide-angle lens assembly according to claim 1, wherein an effective focal length F2 of the second lens and a total effective focal length F of the wide-angle lens assembly satisfy: $-5 < F2/F < -2$.

6. The wide-angle lens assembly according to claim 1, wherein a combined focal length F12 of the first lens and the second lens and a total effective focal length F of the wide-angle lens assembly satisfy: $-1.6 < F12/F < -0.5$.

7. The wide-angle lens assembly according to claim 1, wherein an absolute value of a distance d5 between an image-side surface of the fifth lens and a diaphragm on the optical axis and a total track length TTL of the wide-angle lens assembly satisfies: $0 < |d5|/TTL < 0.1$.

8. The wide-angle lens assembly according to claim 1, wherein an effective focal length F5 of the fifth lens and a total effective focal length F of the wide-angle lens assembly satisfy: $-7 < F5/F < -2$.

9. The wide-angle lens assembly according to claim 1, wherein an effective focal length F6 of the sixth lens and a total effective focal length F of the wide-angle lens assembly satisfy: $1.7 < F6/F < 3$.

10. The wide-angle lens assembly according to claim 1, wherein an effective focal length F9 of the ninth lens and a total effective focal length F of the wide-angle lens assembly satisfy: $-3.5 < F9/F < -1$.

11. The wide-angle lens assembly according to claim 1, wherein
a combined focal length Fa of the first lens to the fifth lens and a total effective focal length F of the wide-angle lens assembly satisfy: $-2.8 < Fa/F < -1$; or
a combined focal length Fb of the sixth lens to the tenth lens and a total effective focal length F of the wide-angle lens assembly satisfy: $1.5 < Fb/F < 2.5$.

12. The wide-angle lens assembly according to claim 1, wherein
a maximal aperture D of the wide-angle lens assembly, a total track length TTL of the wide-angle lens assembly and a semi-image height H of the wide-angle lens assembly satisfy: $0 < D/TTL/H < 0.2$; or
a back focal length BFL of the wide-angle lens assembly and a total track length TTL of the wide-angle lens assembly satisfy: $0.1 < BFL/TTL < 0.3$.

13. The wide-angle lens assembly according to claim 1, wherein a focal length F1 of the first lens, a radius of curvature R11 of an object-side surface of the first lens and a radius of curvature R12 of an image-side surface of the first lens satisfy: $-2.2 < F1/R11 + F1/R21 < -1.3$.

14. The wide-angle lens assembly according to claim 1, wherein a combined effective focal length F34 of the third lens and the fourth lens and an effective focal length F of the wide-angle lens assembly satisfy: $1.5 < F34/F < 2.8$.

15. The wide-angle lens assembly according to claim 1, wherein an effective focal length F4 of the fourth lens and a radius of curvature R42 of an image-side surface of the fourth lens satisfy: $-0.9 < F4/R42 < 1.2$.

16. The wide-angle lens assembly according to claim 1, wherein an effective focal length F5 of the fifth lens and an effective focal length F6 of the sixth lens satisfy: $-2.8 < F5/F6 < -0.8$.

17. The wide-angle lens assembly according to claim 1, wherein a combined effective focal length F78 of the seventh lens and the eighth lens and an effective focal length F of the wide-angle lens assembly satisfy: $2.6 < F78/F < 7.9$.

18. The wide-angle lens assembly according to claim 1, wherein
an effective focal length F10 of the tenth lens and an effective focal length F of the wide-angle lens assembly satisfy: $2.0 < F10/F < 3.7$; or
a radius of curvature R101 of an object-side surface of the tenth lens, a radius of curvature R102 of an image-side surface of the tenth lens, and an effective focal length F of the wide-angle lens assembly satisfy: $-0.5 < (R101+R102)/F < 1.1$.

19. The wide-angle lens assembly according to claim 1, wherein an effective focal length F of the wide-angle lens assembly and an entrance pupil diameter ENPD of the wide-angle lens assembly satisfy: $1.6 < F/ENPD < 1.9$.

20. The wide-angle lens assembly according to claim 1, wherein
a radius of curvature R31 of an object-side surface of the third lens and a radius of curvature R32 of an image-side surface of the third lens satisfy: $-2.6 < (R31-R32)/(R31+R32) < 0.9$; or
a radius of curvature R71 of an object-side surface of the seventh lens and a radius of curvature R72 of an image-side surface of the seventh lens satisfy: $0.1 < (R71-R72)/(R71+R72) < 3.0$.

* * * * *